Sept. 4, 1956 T. SANDY 2,761,450
MACHINE FOR CUTTING POULTRY WINGS
Filed March 12, 1954 2 Sheets-Sheet 1

INVENTOR
Turner Sandy
BY Mason, Fenwick & Lawrence
ATTORNEYS

Sept. 4, 1956 T. SANDY 2,761,450
MACHINE FOR CUTTING POULTRY WINGS
Filed March 12, 1954 2 Sheets-Sheet 2

INVENTOR
*Turner Sandy*

BY *Mason, Fenwick & Lawrence*
ATTORNEYS

United States Patent Office 2,761,450
Patented Sept. 4, 1956

2,761,450

MACHINE FOR CUTTING POULTRY WINGS

Turner Sandy, Bergton, Va.

Application March 12, 1954, Serial No. 415,906

6 Claims. (Cl. 128—318)

This invention relates to cutting machines and particularly to machines of this type which are particularly adapted for clipping off the end joints of poultry wings.

It has been common practice for many years to cut off the end joint of the wings of poultry to prevent the birds from flying. This has usually been done with any available cutting implement. No provision has been made for clipping the wings rapidly and in great numbers. It is the practice to clip the wings of very young birds before the bony structure of the wings becomes hardened.

The object of the present invention is to provide a device for clipping the wings of poultry which is very simple in construction and will cut the wings rapidly and cleanly.

A more specific object is to provide a device of this nature in which the knife housing contains a stationary shear blade and the housing is adjustable to maintain proper shearing relationship of the stationary and movable blades.

Another object of the invention is to provide a wing cutter which is power driven and in which the parts may be mounted without precision alignment.

A still further object of the invention is to provide a cauterizing element and wing guide to insure cauterizing of the cut wing end upon removal of the bird from the machine.

Other objects of the invention will become apparent from the following description of one practical embodiment thereof when taken in conjunction with the drawings which accompany, and form part of, this specification.

Figure 1:
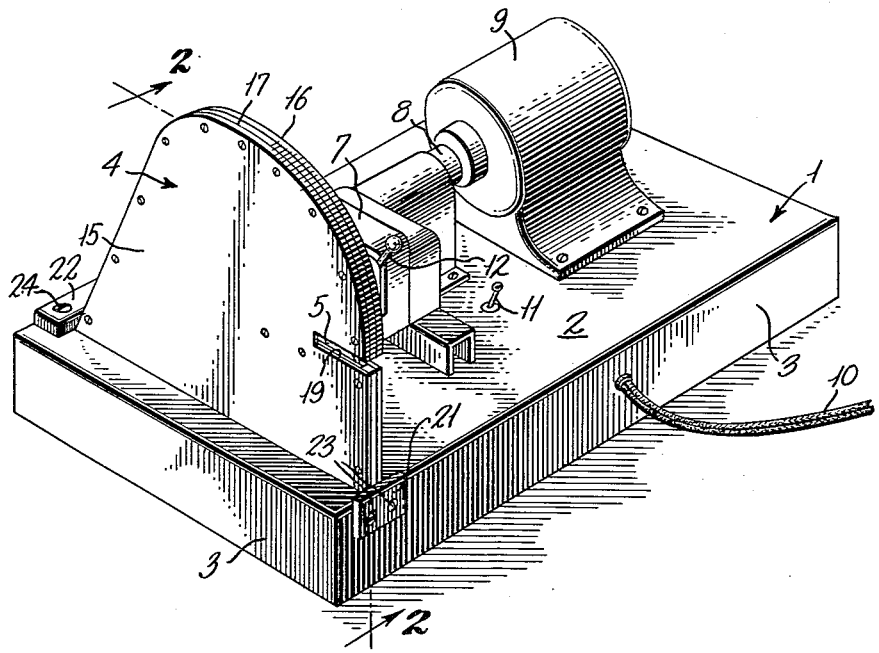
Figure 1 is a perspective view of a cutting machine embodying the principles of the invention.
Figure 2:
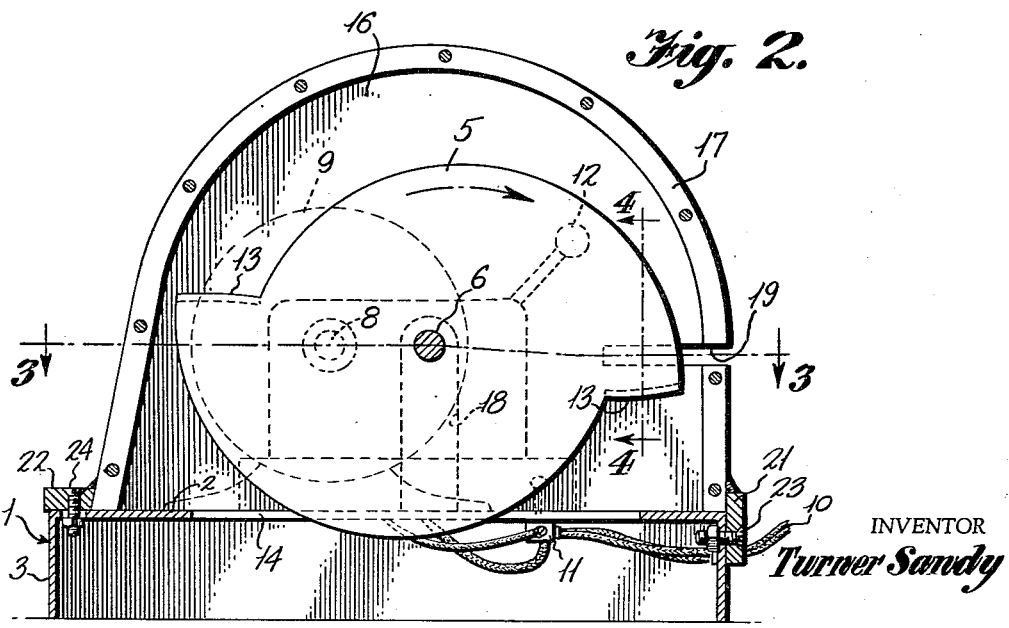
Figure 2 is a vertical section through the base and knife housing and is taken on the line 2—2 of Figure 1.
Figure 3:
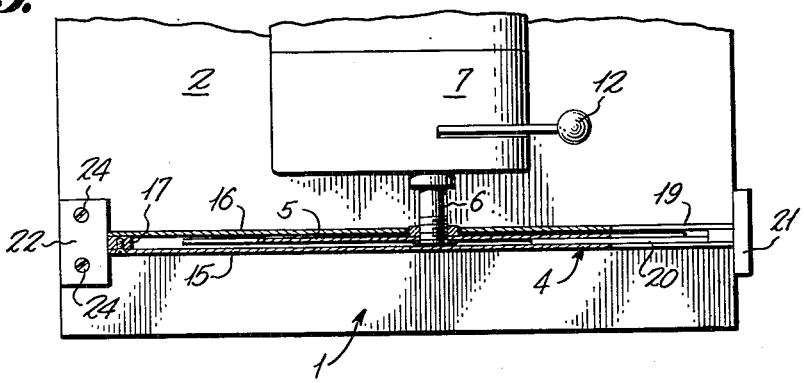
Figure 3 is a horizontal section taken on the line 3—3 of Figure 2.

Referring to the drawings in detail, the cutting machine is shown as comprising a base 1 which consists of a base platform 2 and peripherally depending flanges which form a supporting skirt 3. Near one end of the platform a knife housing 4 is mounted to protect a knife 5 mounted upon a shaft 6. Shaft 6 extends from a torque convertor 7 which is also mounted upon the base platform 2. The input shaft 8 to the convertor is connected to a motor 9. Motor 9 may be of any desirable type, and is shown as a small electrical motor. The motor is also fixed to the base platform 2. Shaft 8 is flexible and, therefore, it is not necessary that the various driving sections of the machine be mounted with precision on the base. The motor is provided with the usual lead wires 10 which may be connected to any suitable source of power. A switch 11 is connected into one of the lead wires so that the motor can be started and stopped without disconnecting the lead wires from the outlet. Although a torque convertor has been shown between the motor and knife, it will be understood that this is merely illustrative of speed change mechanism and any suitable means for changing the driving ratio may be used. The speed convertor shown is provided with a handle 12 by means of which the rotative speed of the knife can be controlled.

Knife blade 5 is provided with two cutting edges which are substantially diametrically opposed. The knife is of the disk type and is notched on opposite sides to form the cutting edges 13. The base platform 2 is provided with a transverse slot 14 through which the lower portion of the knife blade projects.

Figure 4:
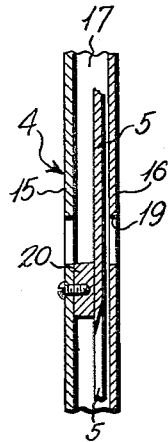
Figure 4 is a fragmentary vertical section taken on the line 4—4 of Figure 2 and showing the operative relationship of the movable knife and stationary shear blade.
Figure 6:
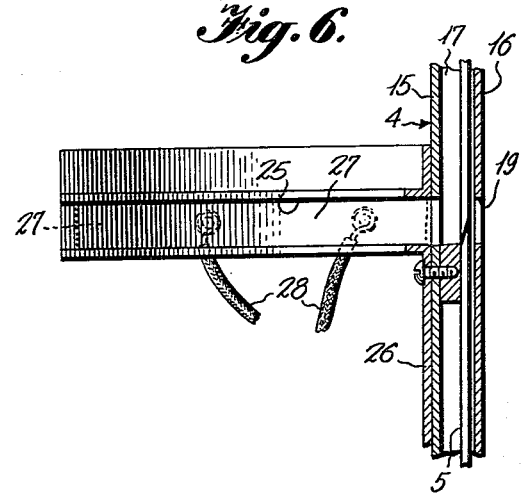
Figure 5:
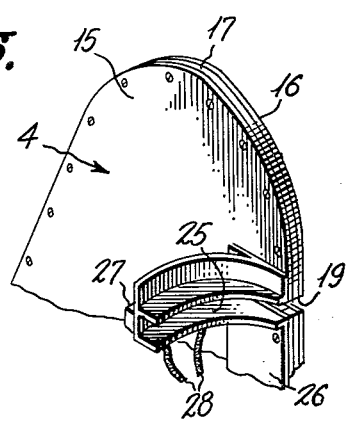
Figure 5 is a perspective view of the knife housing showing the cauterizing element and wing guide attached thereto; and, Figure 6 is a vertical section through the knife housing showing the cauterizing unit and wing guide in elevation.

The knife blade is enclosed by the housing 4 which fits over that portion of the blade above the base platform and is adjustably secured to the base of the machine. The housing consists of side plates 15 and 16 which are held in spaced relation by means of a filler strip 17 positioned between the outer edges of the side plates. The rear plate 16 is slotted vertically from its middle to its lower edge, as at 18, so that the housing may be slipped over the knife shaft 6. An entry slot 19 is provided in the housing to receive the poultry wing to be cut. The slot is cut through both side plates and the filler strip, and extends inwardly from the side edge of the housing a sufficient distance so that the cutting edges of the knife will pass within the area of the slot as the knife rotates. A stationary shear blade 20 is fixed to the inner side of the front housing plate 15 to co-act with the cutting edges of the knife to shear the wing. Shear blade 20 is positioned substantially flush with the lower edge of slot 19 and extends horizontally inwardly from the edge of the housing a distance at least equal to the length of the slot. Shear blade 20 is riveted or screwed to the housing plate. It will be noted from Figure 4 of the drawings that the upper surface of the shear blade inclines upwardly toward the rotating knife 5. This will insure a clean cut when the knife 5 and shear blade 20 are properly adjusted relative to one another.

In order to secure proper adjustment of these elements provision is made for tilting the housing transversely of the machine to change the angular position of the shear blade, and to move one end of the housing toward or from the motor end of the machine to move the shear blade toward or from the knife. To permit these movements, the housing is provided with a vertical mounting bracket 21 attached to the side of the housing having the slot 19 and a horizontal mounting bracket 22 connected to the opposite side of the housing. The vertical bracket is attached to the supporting skirt of the platform by screws 23 and the horizontal bracket is secured to the base platform 2 by means of screws 24. The openings in the brackets for receiving the screws will be slightly larger than the screw shanks so that some movement of the brackets with respect to the screws can be had prior to tightening the screws. In order to tilt the housing transversely of the machine to change the angle of the stationary shear blade, the screws 24 will be removed and shims placed between the bracket and the base platform. To change the angle in the opposite direction one or more shims may be removed. If the screws 23 and 24 are loosened the end of the housing having the slot 19 may be moved slightly longitudinally of the machine to bring the stationary shear blade into closer contact with the knife 5 to secure proper shearing action. When the housing is in proper position the screws can be tightened to hold it in place.

When desired a cauterizing element may be used in connection with the machine. This is shown in the form of an attachment which is connected to the front housing plate 15. The cauterizing element is incorporated in a guide channel 25 which is of U-shaped cross section and arcuate in a lengthwise direction. The spacing between the upper and lower flanges of the guide channel is substantially the same as the width of the slot 19 and the channel is positioned adjacent the slot so it forms a continuation thereof. The channel is attached to a mounting plate 26 which is secured to the side plate of the housing. A cauterizing element 27 is mounted in the back wall of the guide channel so that the back wall of the channel in the area of the cauterizing element may be quite hot. The element may be electrically heated and the wires 28 connected into the leads of the electric motor.

When the device is to be used switch 11 is actuated to start the motor and rotate the knife 5. The speed of the knife is set by operating the handle 12 on the torque convertor and the device is ready for operation. The operator will stand in front of the machine adjacent the slot 19 and will hold the body of the bird and base portion of the wing in his left hand and the outer joint or tip of the wing will be held extended by the right hand and inserted in the slot 19. The rotating knife will sever the wing against the stationary shear bar 20. The severed tip will be discarded and the bird will be set aside. When the cauterizing element is used, the movement of the operator in setting aside the bird will cause the cut end of the wing to follow the guide channel 25 to be brought into contact with the cauterizing element. The arcuate arrangement of the guide channel permits the operator to follow his normal movement in setting aside the bird and yet the cut end of the wing will be brought into contact with the cauterizing element. If, during the operation of the machine, the knife and shear blade get out of shearing relationship, they can be adjusted by following the adjusting procedure previously described. With this machine the wings of poultry may be clipped very rapidly and the clipping and cauterizing may be performed by a single movement of the operator.

While in the above one practical embodiment of the invention has been disclosed, it will be understood that the specific details of construction described and shown are merely for purposes of illustration and that the invention may take other forms within the scope of the appended claims.

What is claimed is:

1. In a machine for cutting the end joint from poultry wings, a base, a knife mounted on said base, a motor on said base and coupled to said knife to rotate said knife, a housing for said knife secured to said base, said housing having a slot intersecting the path of rotation of said knife to provide access for poultry wings to said knife, a shear bar secured to said housing adjacent said slot to cooperate with said knife to shear the wings, and means to adjust said housing to vary the angle of said shear bar and to move said shear bar toward and from said knife.

2. In a machine for cutting the end joint from poultry wings, a base, a knife mounted on said base, a motor on said base and coupled to said knife to rotate said knife, a housing for said knife secured to said base, said housing having a slot intersecting the path of rotation of said knife to provide access for poultry wings to said knife, a shear bar secured to said housing adjacent said slot to cooperate with said knife to shear the wings, and a cauterizing element carried by said housing adjacent said slot.

3. In a machine for cutting the end joint from poultry wings, a base, a knife mounted on said base, a motor on said base and coupled to said knife to rotate said knife, a housing for said knife secured to said base, said housing having a slot intersecting the path of rotation of said knife to provide access for poultry wings to said knife, a shear bar secured to said housing adjacent said slot to cooperate with said knife to shear the wings, an arcuate guide channel carried by said housing adjacent to said slot and forming a continuation thereof, and a cauterizing element mounted in said guide channel to be contacted by a cut wing upon removal from said slot.

4. In a machine for cutting the end joint from poultry wings, a base, a knife mounted on said base, a motor on said base and coupled to said knife to rotate said knife, a housing for said knife secured to said base, said housing having a slot intersecting the path of rotation of said knife to provide access for poultry wings to said knife, and a shear bar secured to said housing adjacent said slot to cooperate with said knife to shear the wings, the coupling between said motor and said knife being a flexible one and including a speed changing mechanism.

5. In a machine for cutting the end joint from poultry wings, a base, a knife mounted on said base, a motor on said base coupled to said knife to rotate the knife, said coupling between said motor and knife being flexible and including a speed changing mechanism, a housing for said knife secured to said base, said housing having a slot intersecting the path of rotation of said knife, a shear bar for cooperation with said knife secured to said housing adjacent said slot, and said housing being adjustable to change the angle of said shear bar and to move said shear bar toward and from said knife.

6. In a machine for cutting the end joint from poultry wings as claimed in claim 5, an arcuate guide channel carried by said housing adjacent said slot and forming a continuation thereof, and a cauterizing element mounted in said guide channel to be contacted by a cut poultry wing upon removal from said slot.

References Cited in the file of this patent

UNITED STATES PATENTS

| | | |
|---|---|---|
| 396,814 | Gendron | Jan. 29, 1889 |
| 1,812,645 | Bergson | June 30, 1931 |